(12) United States Patent
Kirla

(10) Patent No.: US 7,492,709 B2
(45) Date of Patent: Feb. 17, 2009

(54) DATA TRANSMISSION METHOD AND NETWORK ELEMENTS

(76) Inventor: Olli Kirla, Kypäräkuja 9 D8, FI-02610 Espoo (FI)

( * ) Notice: Subject to any disclaimer, the term of this patent is extended or adjusted under 35 U.S.C. 154(b) by 799 days.

(21) Appl. No.: 11/000,506

(22) Filed: Dec. 1, 2004

(65) Prior Publication Data

US 2006/0062145 A1    Mar. 23, 2006

(30) Foreign Application Priority Data

Sep. 17, 2004    (FI) ................... 20045345

(51) Int. Cl.
*H04L 12/26* (2006.01)
(52) U.S. Cl. ...................... 370/230; 370/331
(58) Field of Classification Search ............. None
See application file for complete search history.

(56) References Cited

U.S. PATENT DOCUMENTS

| 6,466,556 | B1 * | 10/2002 | Boudreaux .......... | 370/331 |
| 6,947,399 | B1 * | 9/2005 | Sen et al. .......... | 370/331 |
| 6,973,311 | B2 * | 12/2005 | Yi-Bing et al. ....... | 455/436 |
| 7,215,958 | B2 * | 5/2007 | Kovacs et al. ........ | 455/436 |

FOREIGN PATENT DOCUMENTS

EP    1107632    6/2001

| WO | WO 99/51051 | 10/1999 |
| WO | WO 01/30107 | * 4/2001 |

OTHER PUBLICATIONS

UMTS TR25.936, Handovers for real-time services from PS domain, Technical Report, pp. 1-70, 2000.*
Ai-Chun Pang, et al., "A new Approach for Serving Radio Network Controller Relocation in UMTS All-IP Network", 2004 IEEE, pp. 277-285.
3GPP-ETSI TR 125 936 V4.0.1, "Universal Mobile Telecommunications System (UMTS); Handovers for real-time services from PS domain", Dec. 2001, pp. 1-35.

* cited by examiner

*Primary Examiner*—Frank Duong

(57) ABSTRACT

A method in which user terminal connections are relocated without interruption in the user data flow. The method includes receiving a first message from a core network element at a target network element that indicates a request to transfer a network control from a source network element to the target network element, sending a second message to the core network element from the target network element that acknowledges receipt of the first message, sending user-related data to the source network element and to the core network element using an uplink bi-cast at the target network element, and terminating the sending of the user related data to the source network element from the target network element after the transfer of the network control to the target network element.

27 Claims, 7 Drawing Sheets

DATA TRANSMISSION METHOD AND NETWORK ELEMENTS

FIELD

Figure 1:
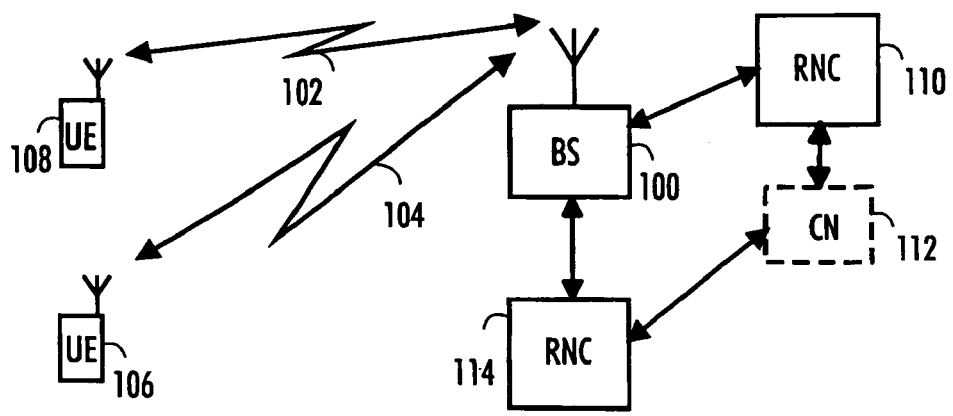

The invention relates to a data transmission method in a communication system and to network elements.

BACKGROUND

Serving radio network controller (SRNC) relocation is an important feature in providing mobility in 3G communication systems. Relocation means a procedure where the routing of a user terminal connection in the Universal mobile telecommunications system (UMTS) terrestrial radio access network (UTRAN) changes.

The relocation procedure is, however, a source of interruption in a user data flow due to switching functions between a drift RNC (DRNC) and a core network (CN). It is not possible to control the switching functions synchronously since there are propagation delays between RNC and CN as well as processing delays of signalling messages. Interruptions in the user data flow are undesirable especially in real time services, e.g. speech and circuit switched data.

BRIEF DESCRIPTION OF THE INVENTION

According to an aspect of the invention, there is provided a data transmission method in a communication system, the method comprising: first communicating at least one message between network elements indicating transfer of a network control from a source network element to a target network element; allocating resources for the network control in the target network element; conveying user-related data to the source network element and to the target network element; second communicating at least one message between network elements for transferring the network control from the source network element to the target network element; and terminating the conveyance of the user-related data to the source network element.

According to an aspect of the invention, there is provided a data transmission method in a communication system, the method comprising: first communicating at least one message between network elements indicating transfer of a network control from a source network element to a target network element; allocating resources for the network control in the target network element; conveying user-related data to the source network element via the target network element in the uplink direction and via a core network element in the downlink direction; second communicating at least one message between network elements for transferring the network control from the source network element to the target network element; and terminating the conveyance of the user-related data to the source network element.

According to another aspect of the invention, there is provided a communication system comprising a source network element, a target network element and a core network element, the communication system comprising: network elements comprising means for communicating at least one message indicating transfer of a network control from the source network element to the target network element; the target network element comprising means for allocating resources for the network control; the core network element comprising means for conveying the user-related data to the source network element in the downlink direction; the target network element comprising means for conveying the user-related data to the source network element in the uplink direction; the network elements comprising means for communicating at least one message for transferring the network control from the source network element to the target network element; and the target network element and the core network element comprising means for terminating the conveyance of the user-related data to the source network element.

According to an aspect of the invention, there is provided a communication system comprising a source network element, a target network element and a core network element, the communication system comprising: network elements comprising means for communicating at least one message indicating transfer of a network control from the source network element to the target network element; the target network element comprising means for allocating resources for the network control; the core network element comprising means for conveying the user-related data to the source network element and to the target network element; the target network element comprising means for conveying the user-related data to the source network element and to the core network element; the network elements comprising means for communicating at least one message for transferring the network control from the source network element to the target network element; and the target network element and the core network element comprising means for terminating the conveyance of the user-related data to the source network element.

According to an aspect of the invention, there is provided a target network element comprising: means for communicating at least one message indicating transfer of a network control from a source network element to a target network element; means for allocating resources for the network control; means for conveying user-related data to the source network element in the uplink direction; means for communicating at least one message between the network elements for transferring the network control from the source network element to the target network element; and means for terminating the conveyance of the user-related data to the source network element.

According to an aspect of the invention, there is provided a target network element comprising: means for communicating at least one message indicating transfer of a network control from the source network element to the target network element; means for allocating resources for the network control; means for conveying user-related data to the source network element and to the core network element; means for communicating at least one message between the network elements for transferring the network control from the source network element to the target network element; and means for terminating the conveyance of the user-related data to the source network element.

According to an aspect of the invention, there is provided a core network element comprising: means for communicating at least one message indicating transfer of a network control from the source network element to the target network element; means for conveying user-related data to the source network element and to the target network element; means for communicating at least one message between the network elements for transferring the network control from the source network element to the target network element; and means for terminating the conveyance of the user-related data to the source network element.

According to an aspect of the invention, there is provided a core network element comprising: means for communicating at least one message indicating transfer of a network control from the source network element to the target network element; means for conveying user-related data to the source network element in the downlink direction; means for communicating at least one message between the network elements for transferring the network control from the source network element to the target network element; and means for terminating the conveyance of the user-related data to the source network element.

According to an aspect of the invention, there is provided a target network element being configured to: communicate at least one message indicating transfer of a network control from the source network element to the target network element; allocate resources for the network control; convey user-related data to the source network element and to the core network element; communicate at least one message between the network elements for transferring the network control from the source network element to the target network element; and terminate the conveyance of the user-related data to the source network element.

According to an aspect of the invention, there is provided a core network element being configured to: communicate at least one message indicating transfer of a network control from the source network element to the target network element; convey user-related data to the source network element and to the target network element; communicate at least one message between the network elements for transferring the network control from the source network element to the target network element; and terminate the conveyance of the user related data to the source network element.

The invention provides several advantages. An embodiment of the invention provides a relocation procedure where a user data flow is uninterrupted during a network control transfer, because user data are bi-cast both to a source radio network controller (an example of a source network element) and to a target radio network controller (an example of a target network element).

LIST OF DRAWINGS

Figure 7:
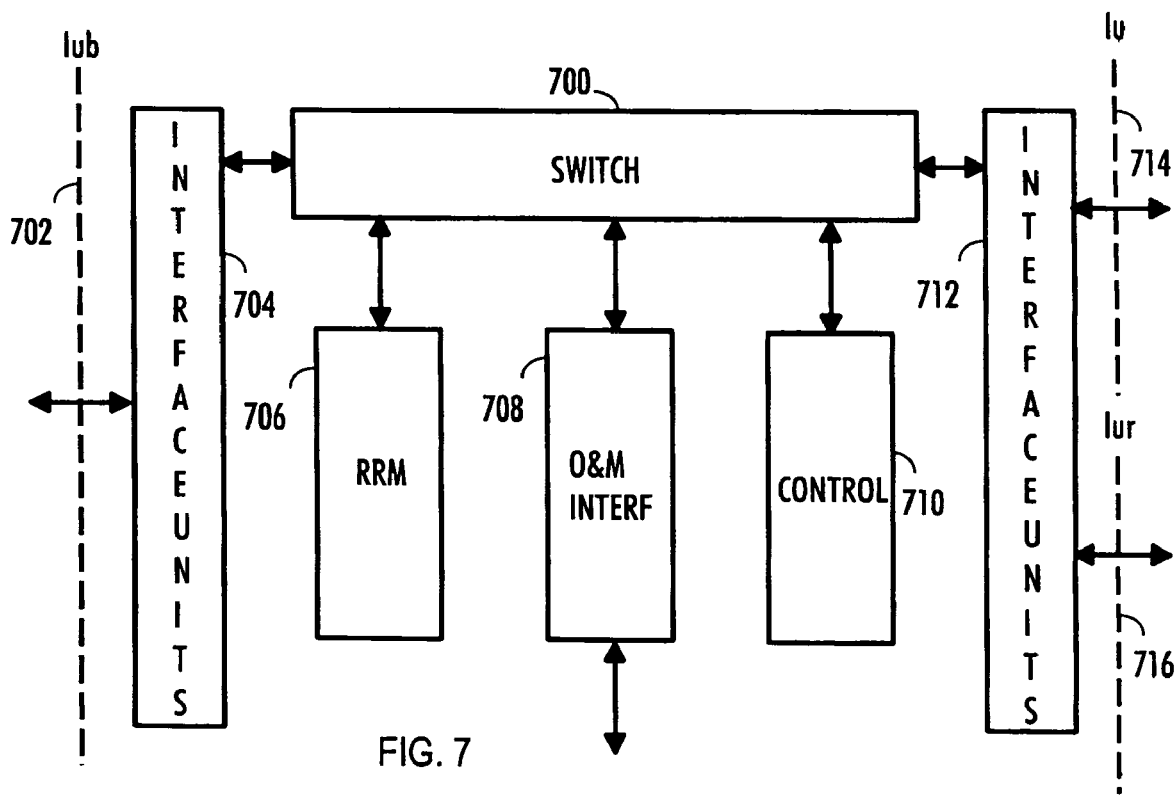
Figure 3A:
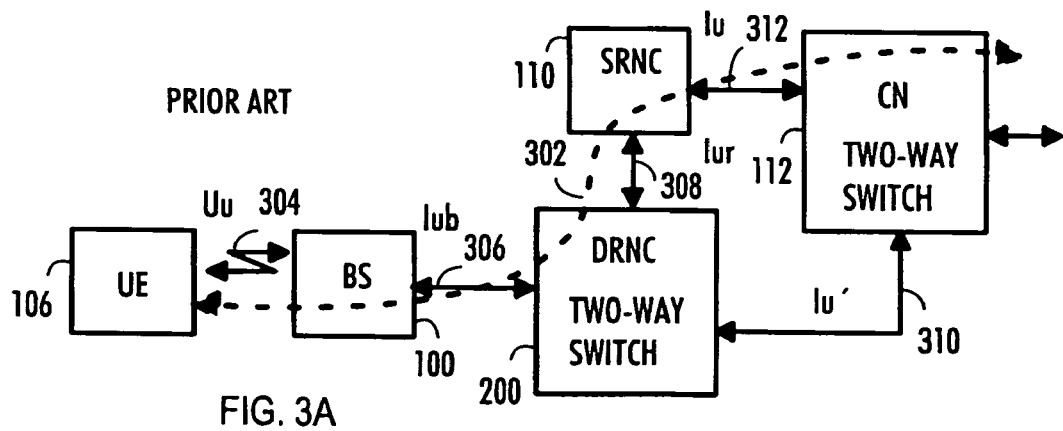
Figure 2:
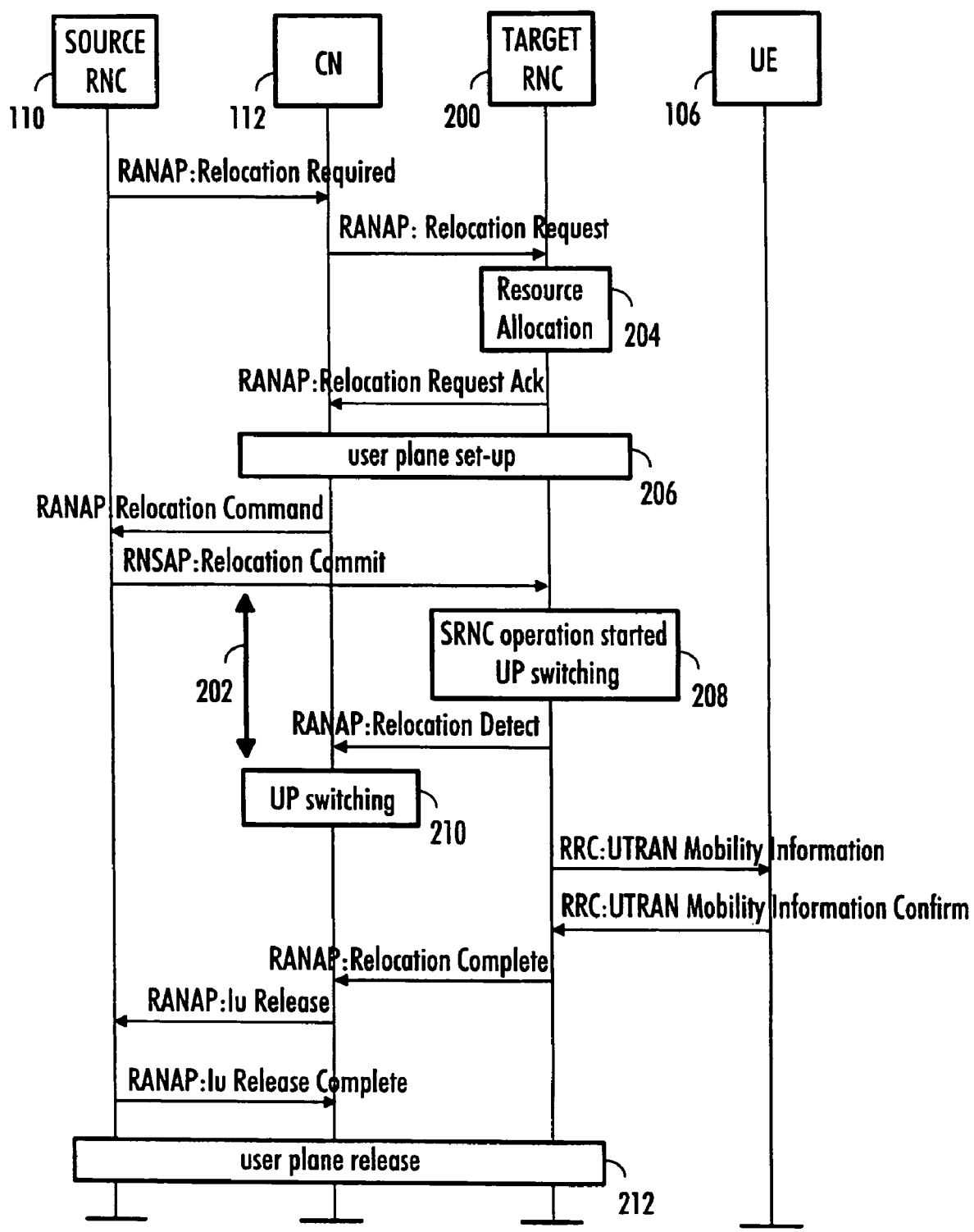
Figure 3B:
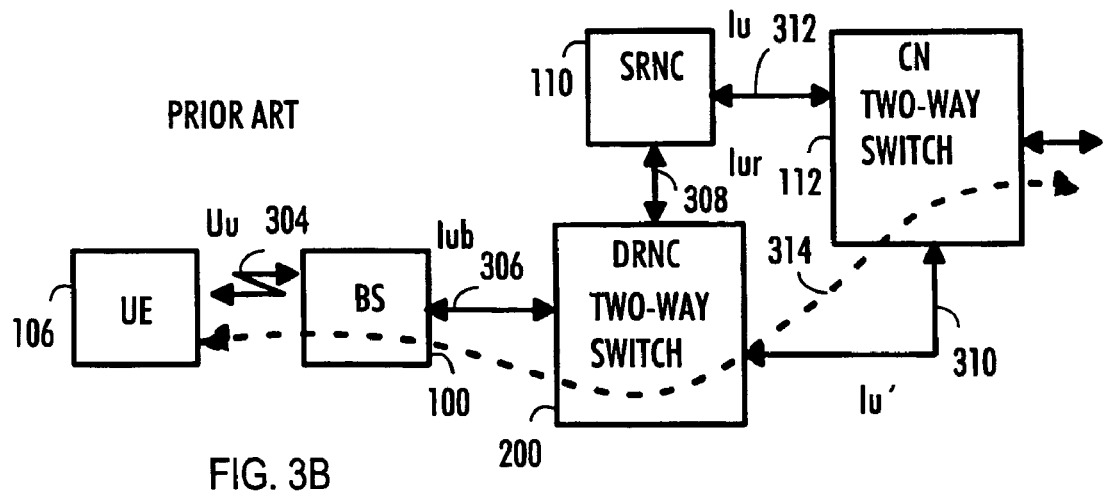
Figure 6A:
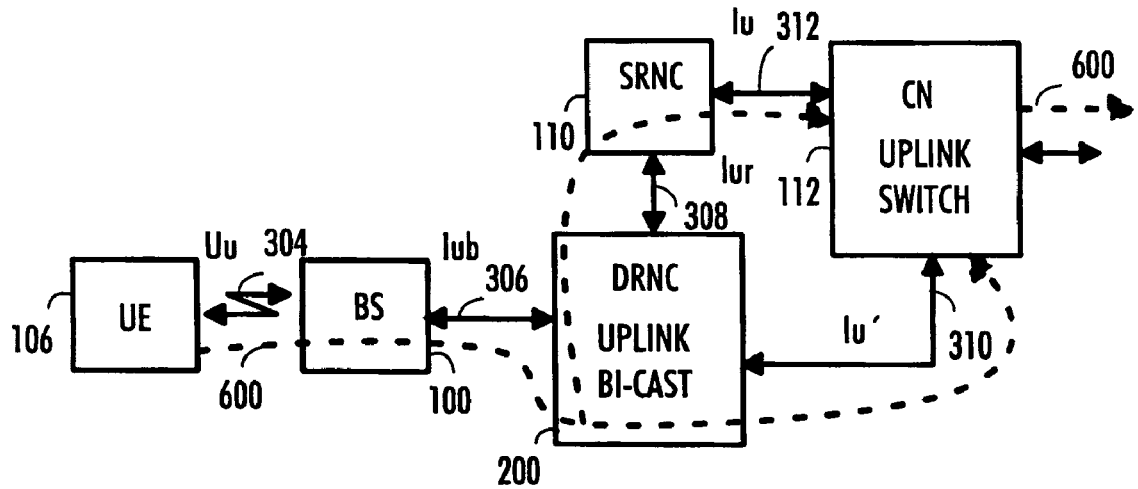
Figure 6B:
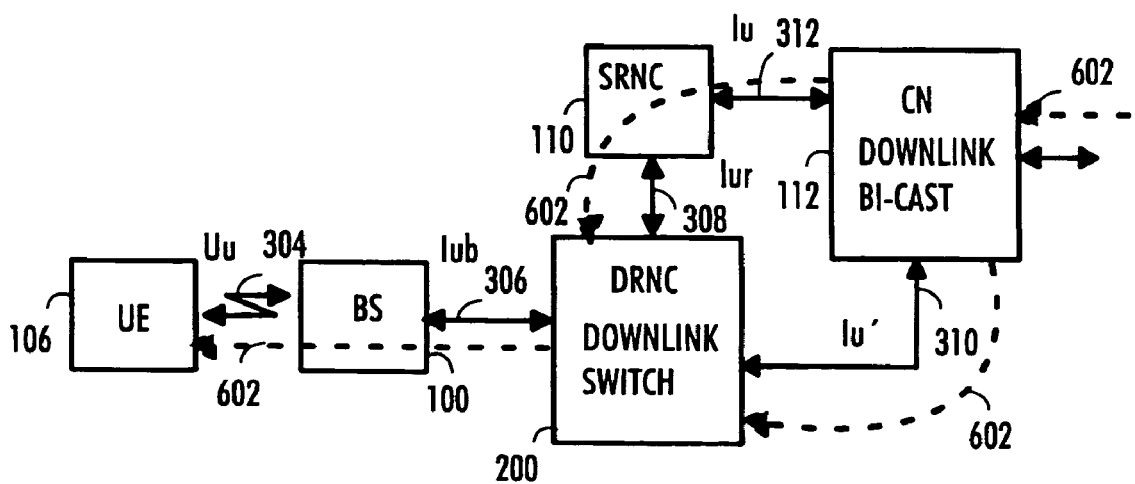
Figure 4:
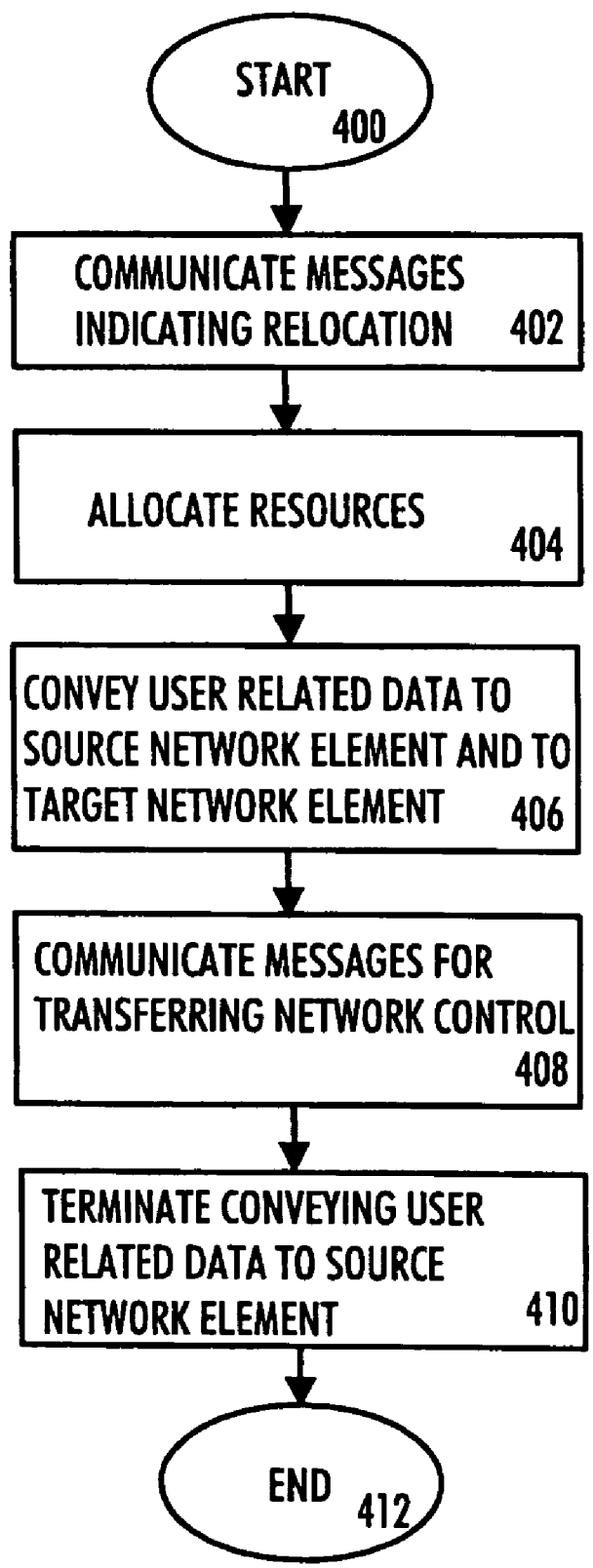
Figure 5:
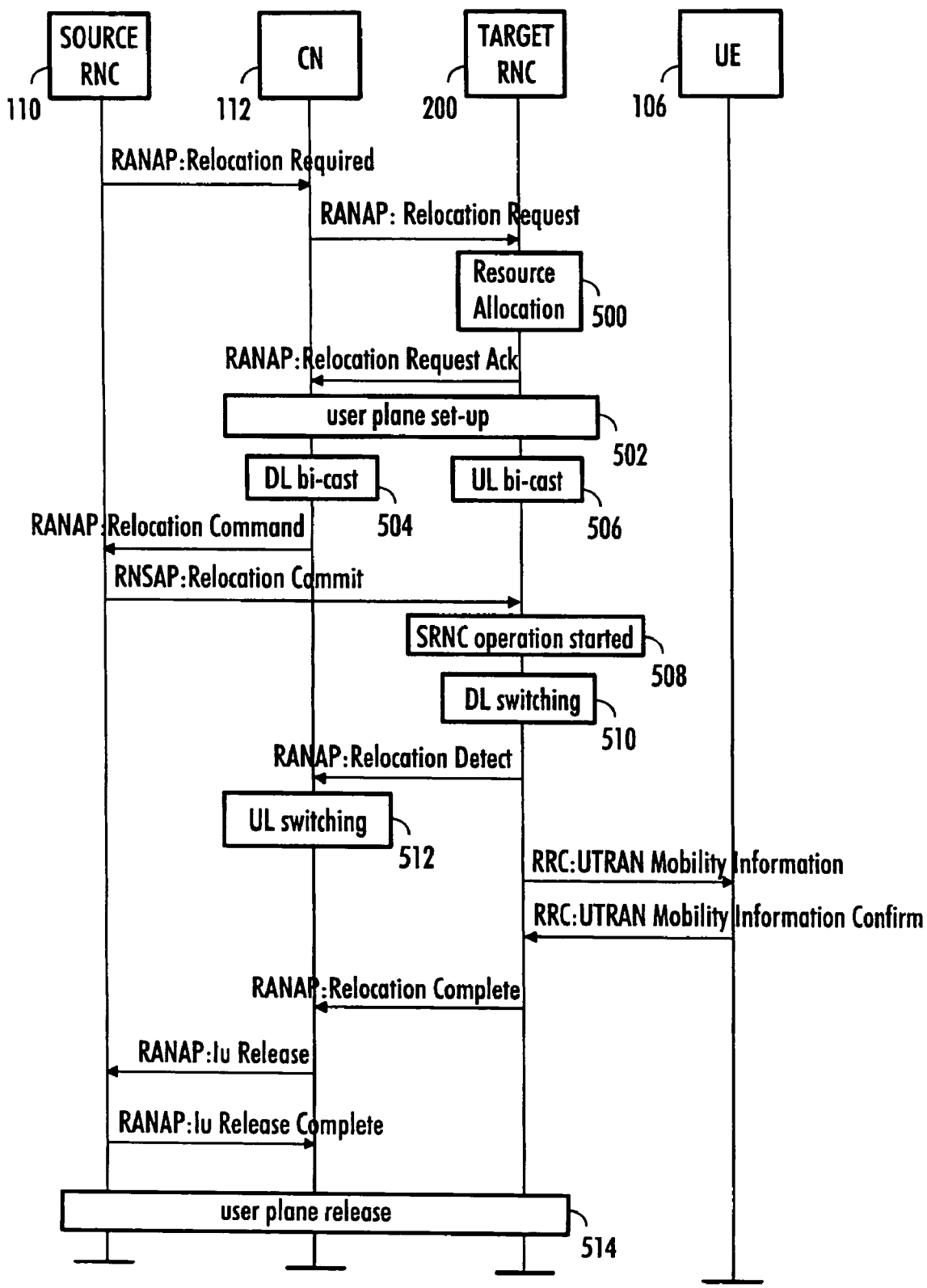
Figure 8:
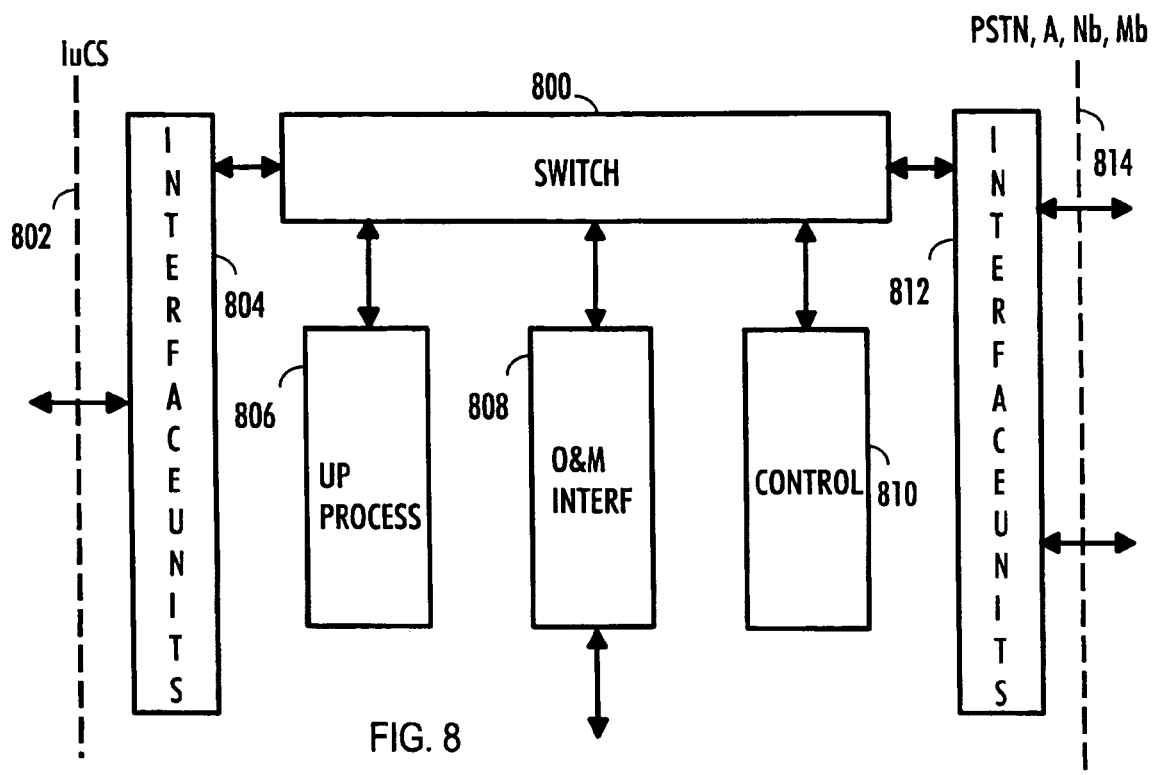
Figure 9:
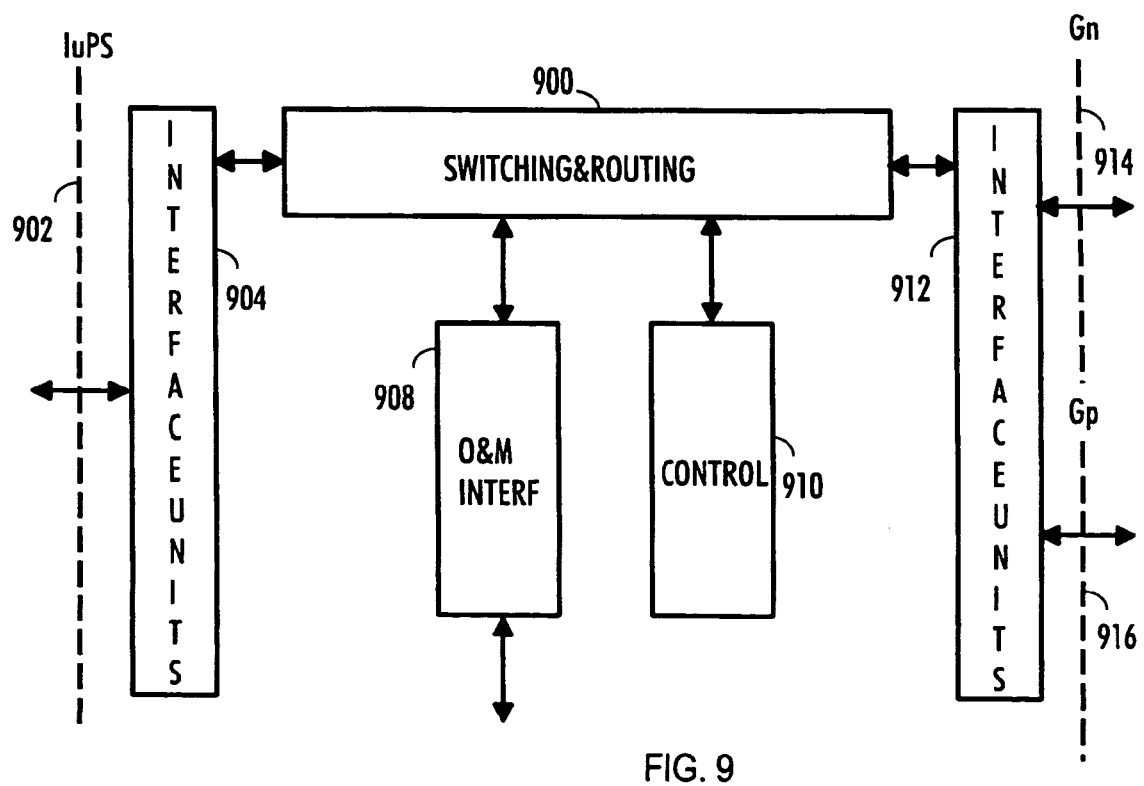
Figure 10:
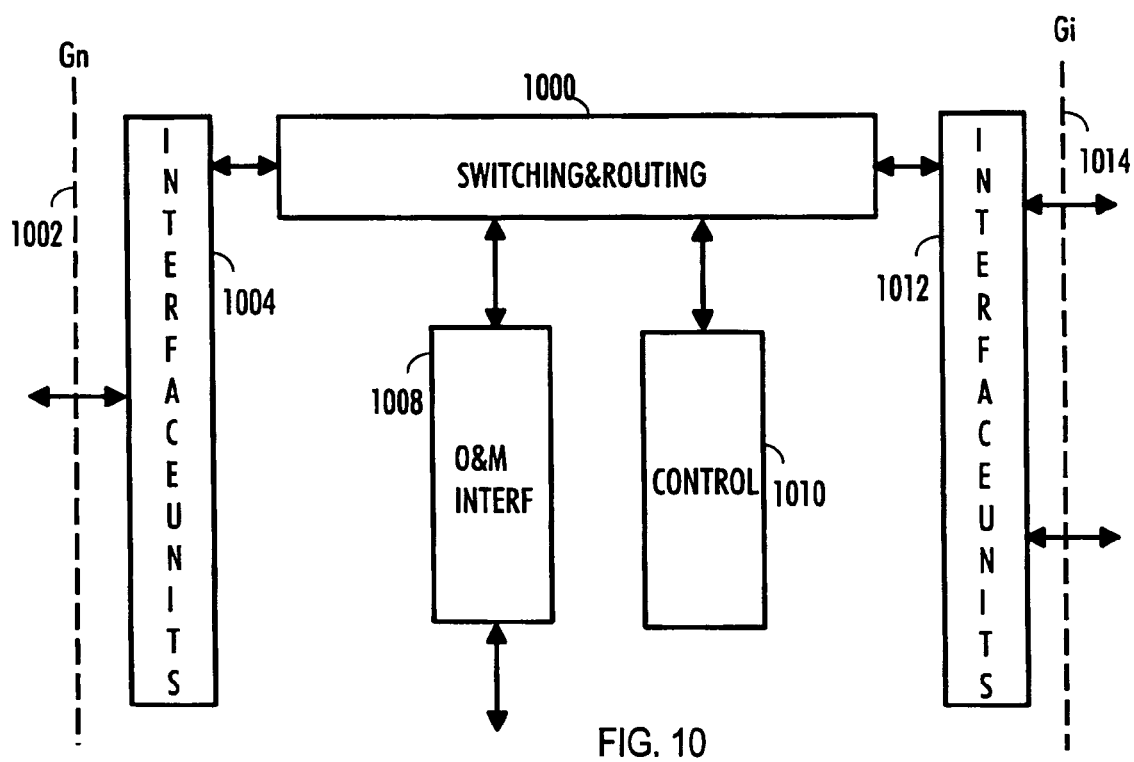

In the following, the invention will be described in greater detail with reference to the embodiments and the accompanying drawings, in which FIG. 1 shows an example of a communication system, FIG. 2 illustrates a prior art example of relocation signalling, FIGS. 3A-B illustrate examples of prior art user data flows, FIG. 4 is a flow chart, FIG. 5 illustrates an example of relocation signalling, FIGS. 6A-B illustrate examples of user data flows, FIG. 7 shows an example of a network controller, FIG. 8 shows an example of a network element, FIG. 9 shows an example of another network element, and FIG. 10 shows an example of another network element,

DESCRIPTION OF EMBODIMENTS

With reference to FIG. 1, we examine an example of a data transmission system to which embodiments of the invention can be applied. The present invention can be applied to various communication systems. One example of such a communication system is the Universal Mobile Telecommunications System (UMTS) radio access network. It is a radio access network, which includes wideband code division multiple access (WCDMA) technology and can also offer real-time circuit and packet switched services. The embodiments are not, however, restricted to the systems given as examples but a person skilled in the art may apply the solution to other systems provided with the necessary properties.

It is clear to a person skilled in the art that the method according to the invention can be applied to systems utilizing different modulation methods or air interface standards.

FIG. 1 is a simplified illustration of a data transmission system to which the solution according to the invention is applicable. This is a part of a cellular radio system that comprises node B (base station) 100, which has bi-directional radio links 102 and 104 to user terminals (UE) 106 and 108. The user terminals may be fixed, vehicle-mounted or portable. The node B includes transceivers, for instance. From the transceivers of the node B, there is a connection to an antenna unit, which establishes the bi-directional radio links to the user terminal. The node B is further connected to radio network controller (RNC) 110, which transmits the connections of the terminals to the other parts of the network. The radio network controller is further connected to core network (CN) 112. Depending on the system, the counterpart on CN side can be mobile services switching centre (MSC), media gateway (MGW) or serving general packet radio service (GPRS) support node (SGSN).

There is also illustrated another radio network controller 114. In this example, radio network controller 110 is a source radio network controller and radio network controller 114 is a target radio network controller in the case of a handover.

The cellular radio system can also communicate with other networks such as a public switched telephone network or the Internet.

Next, prior art relocation signalling is explained by means of FIG. 2. It should be noted that channel resources on radio interface (Uu) between the UMTS terrestrial radio access network (UTRAN) and user equipment (UE, also a user terminal) and on the interface between the RNC and the base transceiver station (Iub) remain unchanged during the relocation. This is called a relocation where the user terminal is not involved. Also a relocation where the user terminal carries out a hard handover is possible. The relocation means a procedure where the routing of a user terminal connection in the Universal mobile telecommunications system (UMTS) terrestrial radio access network (UTRAN) changes. In other words, relocation means the transfer of the SRNC status. The relocation is typically carried out when a moving user terminal leaves the cells controlled by its current radio network controller. This radio network controller remains as a serving radio network controller (SRNC) and traffic between the core network and the user terminal is conveyed via it before the SRNC status is transferred to another radio network controller. The relocation enables more efficient use of communication network resources.

According to FIG. 2, relocation source RNC 110 sends a relocation required message to core network (CN) 112 after it has noticed that the user terminal has left the cells controlled by it. The message type is radio access network application part (RANAP). The RANAP means a radio access network signalling protocol that consists of mechanisms that handle the procedures between the core network and the radio access network (RAN). The message is Relocation Required.

Then core network 112 sends a RANAP: Relocation Request-message to relocation target RNC 200 and target RNC 200 reserves resources for network control 204. The target RNC sends a RANAP: Relocation request Ack-message (Ack=acknowledgement) meaning that it has received the Relocation Request-message.

User plane set-up for a new SRNC connection is carried out after Relocation Request-message 206. The user plane is a layer of a data transmission system in which user data is transported between network nodes typically encapsulated by an appropriate framing structure. A user plane processing includes, for instance, transcoding of speech channels and the data format conversion for data.

RANAP: Relocation command-message is sent from core network 112 to source RNC 110. The source RNC transmits a RNSAP: Relocation commit-message to the target RNC. RNSAP means a radio network subsystem application part. RNSAP is a radio network subsystem signalling protocol for an Iur interface.

Next, the serving RNC transfer and a bi-directional user plane (UP) switching from the Iur to the new Iu 208 are started. The target RNC sends a RANAP: Relocation Detect-message to the core network (CN) and the user plane switching is completed 210. The operation status of the target RNC (Drift RNC) is changed to the SRNC. When the CN receives the Relocation Detect-message, it switches the user plane from the old Iu to a new Iu. Arrow 202 depicts the user data flow interruption caused by the relocation procedure. As can be seen from FIG. 2, the duration of the interruption is remarkable.

An RRC (radio resource control): UTRAN Mobility Information and a UTRAN Mobility Information Confirm-message is changed between the user terminal and the target RNC to update the user terminal's information of SRNC.

The target RNC sends a RANAP: Relocation Complete-message to the core network. The core network in turn sends an Iu Release-message to the source RNC. The source RNC releases Iu connection and sends a RANAP: Iu Release Complete-message to the core network. The user-plane of the old SRNC connection is released after an Iu Release Complete-message 212.

In FIG. 3A a prior art bi-directional user data flow before relocation is depicted. FIG. 3B shows a prior art bi-directional user data flow after relocation.

User terminal 106 has bi-directional connection Uu 304 to base station 100. The interface between base station and DRNC 200 is called Iub 306. The drifting RNC (DRNC) is the target RNC and the serving RNC (SRNC) 110 is the source RNC in this example. The interface between the DRNC and the SRNC is called Iur 308. The interface between the SRNC and the CN is called Iu 312 and the interface between the DRNC and the CN is called Iu' 310 to separate them from each other. The drifting RNC and the core network also include a two-way switch that facilitates switching the user data flow.

The user data is transferred before the relocation via the serving RNC (SRNC), which is shown by dotted line 302. After the relocation, FIG. 3B, the bi-directional data is not conveyed through the original SRNC but only through the DRNC (the target RNC), which now is the new SRNC. The data flow is shown by dotted line 314. The names of the elements have not been changed in FIG. 3B to show more clearly the data flow difference.

In the following, one embodiment of the data transmission method in a communication system is explained in further detail by means of FIG. 4.

The embodiment includes a bi-casting functionality for uplink and downlink directions. Bi-casting means, for instance, that data are sent both to an old Iu and to a new Iu connections (or to an old Iur connection and to a new Iu connection) during the relocation. The bi-casting for the uplink is typically carried out in a radio network controller, and for the downlink, usually in the core network element (in this application, both are called also network elements). The bi-casting to the uplink is typically implemented in such an RNC entity that is capable of conveying simultaneously dedicated transport channel (DCH) frames (3GPP TS 25.427) towards the source RNC through an Iur interface and user plane (UP) frames (3 GPP TS 25.415) towards the core network through an Iu interface. The bi-casting can be carried out in both directions simultaneously.

Typically, the RANAP, RNSAP and RRC signalling remain unchanged compared with the prior art while the embodiment is used. The embodiment starts in block 400.

In block 402, at least one message indicating transfer of a network control from a source network element to a target network element is communicated between network elements. An example of the relocation process can be seen in FIG. 5. In the example, the messages indicating the transfer of the network control are RANAP: Relocation Required and RANAP: Relocation Request.

In block 404 resources for the network control are allocated to the target network element.

In block 406, user related data are conveyed to the source network element and to the target network element. This is called bi-casting. The bi-casting can be started after the user-plane set-up between the core network and the target radio network controller.

In block 408, at least one message for transferring the network control from the source network element to the target network element is communicated between network elements. In the example of FIG. 5, messages conveyed for transferring the network control are, for instance, RANAP: Relocation Command, RNSAP: Relocation Commit and RANAP: Relocation Detect.

In block 410, the conveying of the user-related data to the source network element is terminated. For example, as soon as the CN has received the Relocation Detect-message from the target RNC, the uplink switching from the source RNC to the target RNC Iu connection can be performed. The user data conveyance to the source RNC on the core network side can be stopped either upon receipt of a Relocation Complete or an Iu Release message, or when the user plane between the source RNC and the CN is released.

The embodiment ends in block 412.

The bi-cast of each transmission direction is typically performed nearer the source of the data than a switching element. For example, the relocation of the UMTS system: the uplink bi-cast is performed in the DRNC and the uplink switching in the CN. The downlink bi-cast is performed in the CN and the downlink switching in the DRNC. This facilitates an uninterrupted relocation for both directions when there is delay between network elements.

The bi-casting may mean that the user data are both conveyed to a source network element and to a target network element when the data are conveyed both to the Iu connection of the source network element and to the Iu connection of the target network element.

The bi-casting may also mean that data are conveyed to both a source network element and to a core network element, both to the Iur connection of the source network element and to the Iu connection between the target and core network elements.

Next, an example of relocation signalling according to an embodiment is explained by means of FIG. 5.

Relocation source RNC 110 sends a relocation required message to core network (CN) 112 after it has noticed that the user terminal has left the cells controlled by it. The message type is radio access network application part (RANAP). RANAP means a radio access network signalling protocol that consists of mechanisms that handle the procedures between the core network and the radio access network (RAN). The message is a Relocation Required message.

Then core network 112 sends a RANAP: Relocation Request-message to relocation target RNC 200 and target RNC 200 reserves resources for network control 500. The target RNC sends a RANAP: Relocation request Ack-message (Ack=acknowledgement) meaning that it has received the Relocation Request-message.

A user plane set-up for a new SRNC connection is carried out after Relocation Request-message 502.

After the user plane set-up, downlink (DL) and uplink (UL) bi-casting 504, 506 are started in core network 112 and in target RNC (drift RNC) 200.

A RANAP: Relocation command-message is sent from core network 112 to source RNC 110. The source RNC transmits a RNSAP: Relocation commit-message to the target RNC. The RNSAP means radio network subsystem application part that is a radio network subsystem signalling protocol for the Iur interface.

A serving RNC transfer operation 508 begins after the target RNC has received a Relocation Commit-message from the source RNC. The downlink user data flow is switched from Iur to target Iu connection 510. Due to the downlink bi-casting, relocation switching without interruption in the user data flow is possible in the downlink direction.

The target RNC sends a RANAP: Relocation Detect-message to the core network (CN). When the CN receives the Relocation Detect-message, it switches the uplink user data flow from the old Iu to a new Iu 512. Uplink data frames are conveyed from the target RNC to the source RNC until the dedicated traffic channel (DCH) is released on the Iur. During the uplink bi-casting, The same data frames are available on the source and target Iu connections facilitating relocation switching without interruption in the user data flow in the uplink direction.

RRC (radio resource control): UTRAN Mobility Information and UTRAN Mobility Information Confirm-messages are changed between the user terminal and the target RNC to update the user terminal's information of SRNC.

The target RNC sends a RANAP: Relocation Complete-message to the core network which in turn sends a Iu Release-message to the source RNC. The Source RNC releases Iu connection and sends a RANAP: Iu Release Complete-message to the core network. The user plane of the old SRNC connection is released after Iu Release Complete-message 514. The downlink bi-casting can be stopped either when an Iu Release message is sent on the receipt of an Iu Release Complete, or when the user plane between the source RNC and the CN is released.

FIGS. 6A-B illustrate examples of data flows of user related data according to the embodiment described above. FIG. 6A illustrates an uplink user data flow during the relocation and FIG. 6B illustrates a downlink data flow during the relocation.

User terminal 106 has a bi-directional connection Uu 304 to base station 100. The interface between base station and DRNC 200 is called Iub 306. The drifting RNC (DRNC) is the target RNC and the serving RNC (SRNC) 110 is the source RNC in this example. The interface between the DRNC and the SRNC is called Iur 308. The interface between the SRNC and the CN is called Iu 312 and the interface between the DRNC and the CN is called Iu' 310 to separate them from each other. The drifting RNC includes means for bi-casting to the uplink direction and the core network includes an uplink switch. Furthermore, the CN includes means for bi-casting in the downlink direction and the drifting RNC includes a downlink switch.

In the uplink direction, user data are transferred from user terminal 106 via drifting RNC 200 (the target RNC) and via serving RNC 110 to core network (CN) 112. The data flow is marked in FIG. 6A by dotted line 600.

In downlink direction, the user data are transferred from core network (CN) 112 through drifting RNC 200 (the target RNC) and via serving RNC 110 to user terminal 106. The data flow is marked in FIG. 6B by dotted line 602.

After the relocation, drifting RNC 200 will be a new serving RNC.

Referring to FIG. 7, a simplified block diagram illustrates an example of a radio network controller's (RNC) logical structure. A radio network controller is an example of (a source or) a target network element. The RNC is the switching and controlling element of the UTRAN. Switching 700 takes care of connections between the core network and the user terminal. The radio network controller is located between Iub 702 and Iu 714 interfaces. The network controller is connected to these interfaces via interface units 704, 712. There is also an interface for inter-RNC transmission called Iur 716. The interfaces can also be IuCS or IuPS.

The functionality of the radio network controller can be classified into two categories: UTRAN radio resource management 706 and control functions 710. Operation and management interface function 708 serves as a medium for information transfer to and from network management functions. The radio resource management is a group of algorithms used to share and manage the radio path connection so that the quality and capacity of the connection are adequate. The most important radio resource management algorithms are handover control, power control, admission control, packet scheduling, and code management. The UTRAN control functions take care of functions related to the set-up, maintenance and release of a radio connection between the base stations and the user terminals.

The precise implementation of the radio network controller (RNC) is vendor-dependent.

The disclosed functionalities of the embodiments of the invention, such as controlling the bi-casting, can be advantageously implemented by means of software in appropriate parts of a radio network controller (typically in switching functions 700 and in operation and management interface functions 708). Other implementation solutions are also possible such as different hardware implementations, e.g. a circuit built of separate logics components or one or more client-specific integrated circuits (Application-Specific Integrated Circuit, ASIC). A hybrid of these implementations is also feasible.

Referring to FIG. 8, a simplified block diagram illustrates an example of a mobile switching center's logical structure. A mobile switching center or a multi-media gateway (MGW) are examples of a core network element (or a network element). One example of the mobile switching center device is a mobile services switching center (MSC) other abbreviations may also be used. A mobile switching center is a network element that performs switching functions in its operation area and controls the inter-working with other networks, such as public switched telephone network (PSTN).

Switching 800 takes care of connections between other networks and a base station system. The mobile switching center is located between IuCS 802 and PSTN (or A, Nb, Mb, of which the two latter ones are used in MGW) 814 interfaces. The mobile switching center is connected to these interfaces via interface units 804, 812.

The functionality of the mobile switching center can be classified into two categories: user plane processing 806 and control functions 810. If the user plane and control plane processing are separated, MGW carries out the user plane processing and MSC Server handles the control plane processing. Operation and management interface function 808 serves as a medium for information transfer.

The precise implementation of the mobile switching center is vendor-dependent.

The disclosed functionalities of the embodiments of the invention, such as controlling the bi-casting, can be advantageously implemented by means of software in appropriate parts of a mobile switching center (for instance in switching functions 800 and in user plane processing functions 806). Other implementation solutions are also possible such as different hardware implementations, e.g. a circuit built of separate logics components or one or more client-specific integrated circuits (Application-Specific Integrated Circuit, ASIC). A hybrid of these implementations is also feasible.

In FIG. 9, a simplified block diagram illustrates an example of a serving GPRS support node's logical structure (GPRS=general packet radio service). A serving GPRS support node (SGSN) is another example of a third network element (or a network element). SGSN is a GPRS support node that serves a GPRS user terminal by sending or receiving packets via a base station sub-system or a radio access network.

Switching and routing 900 takes care of connections between a base station sub-system and a radio network sub-system. The SGSN is located between IuPS 902 and Gn 914 or Gp 916 interfaces. The Gn interface is used when SGSN and a gateway GPRS support node (GGSN) are located inside the same public land mobile network (PLMN). The Gp interface is used if the SGSN and the GGSN are located in different PLMNs. The SGSN is connected to these interfaces via interface units 904, 912.

The functionality of the SGSN includes control functions 910. Operation and management interface function 908 serves as a medium for information transfer.

The precise implementation of the SGSN is vendor-dependent.

The disclosed functionalities of the embodiments of the invention, such as controlling the bi-casting, can be advantageously implemented by means of software in appropriate parts of an SGSN (for instance in switching functions 900). Other implementation solutions are also possible such as different hardware implementations, e.g. a circuit built of separate logics components or one or more client-specific integrated circuits (Application-Specific Integrated Circuit, ASIC). A hybrid of these implementations is also feasible.

Referring to FIG. 10, a simplified block diagram illustrates an example of a gateway GPRS support node's logical structure (GPRS=general packet radio service). A gateway GPRS support node (GGSN) is yet another example of a third network element. The GGSN is a GPRS support node that acts as a gateway between the GPRS network and a packet switched public data network (PSPDN).

For the PSPDN, the GPRS network resembles a sub-network that can transfer data to or from a GPRS user terminal. The GGSN encapsulates packets. The external network sees the GGSN as a router to a sub-network.

Switching and routing 1000 takes care of connections between the SGSN and the GGSN. The SGSN is located between Gn 1002 and Gi 1014 interfaces. The Gn interface is used when the GGSN and the SGSN are located inside the same public land mobile network (PLMN). The SGSN is connected to these interfaces via interface units 1004, 1012.

The functionality of the GGSN includes control functions 1010. Operation and management interface function 1008 serves as a medium for information transfer.

The precise implementation of the GGSN is vendor-dependent.

The disclosed functionalities of the embodiments of the invention, such as controlling the bi-casting, can be advantageously implemented by means of software in appropriate parts of a GGSN (for instance in switching functions 1000). Other implementation solutions are also possible such as different hardware implementations, e.g. a circuit built of separate logics components or one or more client-specific integrated circuits (Application-Specific Integrated Circuit, ASIC). A hybrid of these implementations is also feasible.

Even though the invention is described above with reference to an example according to the accompanying drawings, it is clear that the invention is not restricted thereto but it can be modified in several ways within the scope of the appended claims.

The invention claimed is:

1. A data transmission method in a communication system, the method comprising:
    receiving a first message from a core network element at a target network element, the first message indicating a request to transfer a network control from a source network element to the target network element;
    sending a second message to the core network element from the target network element, the second message acknowledging receipt of the first message;
    after sending the second message, sending user-related data to the source network element and to the core network element using an uplink bi-cast at the target network element; and
    terminating the sending of the user related data to the source network element from the target network element after the transfer of the network control to the target network element.

2. The data transmission method of claim 1, further comprising:
    receiving a third message from the source network element at the core network element, the third message indicating transfer of the network control from the source network element to the target network element;
    sending the first message to the target network element from the core network element,;
    receiving the second message from the target network element at the core network element, and;
    sending second user-related data to the source network element and to the target network element using a downlink bi-cast at the core network element.

3. The method of claim 2, wherein the third message is a radio access network application part: relocation required message.

4. The method of claim 2, further comprising:
    after sending the second user-related data, receiving a fourth message from the target network element at the core network element, the fourth message indicating a relocation detection; and
    switching an uplink of the user-related data from the source network element to the target network element in response to receiving the fourth message.

5. The method of claim 2, further comprising receiving the user related data from the source network element and from the target network element at the core network element.

6. The method of claim 5, wherein receiving the user related data from the source network element at the core network element is terminated after a dedicated traffic channel is released between the source network element and the target network element.

7. The method of claim 2, wherein the sending of the second user related data to the source network element is terminated after sending a release message to the source network element from the core network element, after receiving a release complete message from the source network element at the core network element, or when a user plane between the source network element and the core network element is released.

8. The method of claim 1, wherein the first message is a radio access network application part: relocation request message.

9. The method of claim 1, wherein the second message is a radio access network application part: relocation request acknowledgement message.

10. The method of claim 1, further comprising:
after communicating the user-related data, receiving a third message from the source network element at the target network element, the third message indicating a relocation commit; and
switching a downlink of the user-related data from the source network element to the core network element in response to receiving the third message.

11. The method of claim 1, further comprising receiving second user related data from the source network element and the core network element at the target network element.

12. The method of claim 1, wherein the communication of the user related data is terminated after a dedicated traffic channel is released between the source network element and the target network element.

13. The data transmission method of claim 1, further comprising:
sending a third message to the core network element from the source network element, the third message indicating transfer of the network control from the source network element to the target network element;
receiving the user-related data from the target network element at the source network element;
sending the user-related data to the core network element from the source network element; and
receiving second user-related data from the core network element at the source network element; and
sending the second user-related data to the target network element from the source network element.

14. The method of claim 13, wherein receiving the second user related data from the core network element at the source network element is terminated after receiving a release message from the core network element at the source network element, after sending a release complete message from the source network element to the core network element, or when a user plane between the source network element and the core network element is released.

15. The method of claim 13, wherein receiving the user related data is terminated after a dedicated traffic channel is released between the source network element and the target network element.

16. A communications system comprising a target network element, the target network element comprising:
an interface unit configured
to receive a first message from a core network element, the first message indicating a request to transfer a network control from a source network element to the target network element;
to send a second message to the core network element, the second message acknowledging receipt of the first message; and
to send user-related data to the source network element and to the core network element using an uplink bi-cast at the target network element after sending the second message; and
a logical structure configured to terminate the sending of the user related data to the source network element after the transfer of the network control to the target network element.

17. The system of claim 16, further comprising a core network element comprising:
a second interface unit configured
to receive a third message from the source network element, the third message indicating transfer of the network control from the source network element to the target network element;
to send the first message to the target network element;
to receive the second message from the target network element at the core network element; and
to send second user-related data to the source network element and to the target network element using a downlink bi-cast at the core network element; and
a second logical structure configured to terminate the sending of the user related data to the source network element after the transfer of the network control to the target network element.

18. The system of claim 17, wherein the interface unit is further configured:
after sending the second user-related data, to receive a fourth message from the target network element, the fourth message indicating a relocation detection; and
to switch an uplink of the user-related data from the source network element to the target network element in response to receiving the fourth message.

19. The system of claim 17, wherein the interface unit is further configured to receive the user related data from the source network element and from the target network element.

20. The system of claim 19, wherein receiving the user related data from the source network element is terminated after a dedicated traffic channel is released between the source network element and the target network element.

21. The system of claim 17, wherein the sending of the second user related data to the source network element is terminated after sending a release message to the source network element, after receiving a release complete message from the source network element, or when a user plane between the source network element and the core network element is released.

22. The system of claim 16, wherein the interface unit is further configured:
after communicating the user-related data, to receive a third message from the source network element, the third message indicating a relocation commit; and
to switch a downlink of the user-related data from the source network element to the core network element in response to receiving the third message.

23. The system of claim 16, wherein the interface unit is further configured to receive second user related data from the source network element and the core network element.

24. The system of claim 16, wherein the communication of the user related data is terminated after a dedicated traffic channel is released between the source network element and the target network element.

25. The system of claim 16, further comprising a source network element comprising:
a second interface unit configured
to send a third message to the core network element, the third message indicating transfer of the network control from the source network element to the target network element;
to receive the user-related data from the target network element;

to send the user-related data to the core network element;

to receive second user-related data from the core network element; and to send the second user-related data to the target network element; and a logical structure configured to terminate the communication with the target network element after the transfer of the network control to the target network element.

26. The system of claim 25, wherein receiving the second user related data from the core network element at the source network element is terminated after receiving a release message from the core network element, after sending a release complete message to the core network element, or when a user plane between the source network element and the core network element is released.

27. The system of claim 25, wherein receiving the user related data is terminated after a dedicated traffic channel is released between the source network element and the target network element.

* * * * *

UNITED STATES PATENT AND TRADEMARK OFFICE
CERTIFICATE OF CORRECTION

PATENT NO. : 7,492,709 B2
APPLICATION NO. : 11/000506
DATED : December 1, 2004
INVENTOR(S) : Olli Kirla It is certified that error appears in the above-identified patent and that said Letters Patent is hereby corrected as shown below:

Claim 18, Col. 12, Line 22

Insert the word --second-- before the word "interface."

Claim 19, Col. 12, Line 30

Insert the word --second-- before the word "interface."

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,492,709 B2  
APPLICATION NO. : 11/000506  
DATED : February 17, 2009  
INVENTOR(S) : Olli Kirla It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1112 days.

Signed and Sealed this

Second Day of November, 2010

David J. Kappos  
*Director of the United States Patent and Trademark Office*